(12) United States Patent
Hsu (10) Patent No.: US 7,106,244 B2
(45) Date of Patent: Sep. 12, 2006

(54) FREIGHT CONTAINER MONITORING SYSTEM

(75) Inventor: Hsiongwei Hsu, Great Neck, NY (US)

(73) Assignee: Phalanx Group, LLC, Hartford, CT (US)

( * ) Notice: Subject to any disclaimer, the term of this patent is extended or adjusted under 35 U.S.C. 154(b) by 182 days.

(21) Appl. No.: 10/790,563

(22) Filed: Mar. 1, 2004

(65) Prior Publication Data
US 2005/0190097 A1    Sep. 1, 2005

(51) Int. Cl.
*G01S 13/04* (2006.01)
*G01S 13/88* (2006.01)

(52) U.S. Cl. .......................... 342/27; 342/28; 342/52; 342/58; 342/60; 342/175; 342/190; 342/192; 342/193; 342/195; 342/196

(58) Field of Classification Search ............... 342/22, 342/27, 28, 42–58, 118, 124, 175, 190–197, 342/60, 89, 90, 128–145; 246/122 R; 367/87, 367/93, 94, 99–116; 340/431, 540–567, 340/825.36
See application file for complete search history.

(56) References Cited

U.S. PATENT DOCUMENTS

| | | | | |
|---|---|---|---|---|
| 3,500,395 A | * | 3/1970 | Foster et al. ................. | 342/27 |
| 3,504,173 A | * | 3/1970 | Brinker .................. | 246/122 R |
| 3,772,668 A | * | 11/1973 | Smith ........................... | 342/42 |
| 4,016,529 A | * | 4/1977 | Inuzuka et al. ............... | 367/93 |
| 4,197,537 A | * | 4/1980 | Follen et al. ................. | 342/27 |
| 4,382,291 A | * | 5/1983 | Nakauchi ..................... | 367/93 |
| 4,639,902 A | * | 1/1987 | Leverance et al. ............ | 367/93 |
| 4,952,939 A | * | 8/1990 | Seed ............................ | 342/27 |
| 5,371,490 A | * | 12/1994 | Martinides .................... | 342/27 |
| 5,448,220 A | * | 9/1995 | Levy ............................ | 342/50 |
| 5,524,133 A | | 6/1996 | Neale et al. | |
| 5,717,390 A | * | 2/1998 | Hasselbring ................ | 342/44 |
| 5,910,973 A | | 6/1999 | Grodzins | |
| 6,047,588 A | | 4/2000 | Danilychev | |
| 6,169,512 B1 | * | 1/2001 | Beasley ........................ | 342/28 |
| 6,222,481 B1 | * | 4/2001 | Abrahamson et al. ........ | 342/90 |
| 6,344,818 B1 | * | 2/2002 | Markov ........................ | 342/22 |
| 6,359,582 B1 | * | 3/2002 | MacAleese et al. .......... | 342/22 |
| 6,480,141 B1 | * | 11/2002 | Toth et al. .................... | 342/22 |
| 6,542,580 B1 | | 4/2003 | Carver et al. | |
| 6,552,346 B1 | | 4/2003 | Verbinski et al. | |
| 6,647,091 B1 | | 11/2003 | Fenkart et al. | |
| 6,687,609 B1 | * | 2/2004 | Hsiao et al. .................. | 342/27 |
| 6,720,905 B1 | * | 4/2004 | Levitan et al. ................ | 342/22 |
| 6,894,639 B1 | * | 5/2005 | Katz ............................ | 342/90 |
| 2003/0160701 A1 | | 8/2003 | Nakamura et al. | |
| 2003/0189510 A1 | | 10/2003 | Anderton et al. | |

* cited by examiner

*Primary Examiner*—Bernarr E. Gregory
(74) *Attorney, Agent, or Firm*—Bachman & LaPointe, P.C.

(57) ABSTRACT

A system and a method for monitoring a freight container are provided. The method includes the steps of generating a resonant spectrum representative of an initial condition of internal surfaces and contents of the freight container, and saving the resonant spectrum for future comparison purposes. The method further includes generating a second resonant spectrum and comparing the second resonant spectrum with the initial resonant spectrum to determine whether there has been any tampering with the freight container. The method also includes identifying the contents of the freight container and generating loading diagrams of the contents and using polarity configuration characteristics of the internal surfaces of said freight container to determine whether the contents have moved or been shifted during transport.

29 Claims, 10 Drawing Sheets

FIG. 10 ated areas. Still further, freight containers are being used as a way to smuggle people undetected into countries, which will bring social instability to our society.

FREIGHT CONTAINER MONITORING SYSTEM

BACKGROUND OF THE INVENTION

The present invention relates to a system and method for monitoring a freight container and, in particular, for identifying the contents of the freight container, for detecting whether the boundary of the container has changed in any respect, and for detecting whether the contents have shifted or been moved during transport.

Containerized shipping is the most common method of freight shipment in today's economy. About 90% of the $12.5 trillions of merchandise traded worldwide was handled by containerized shipping involving about 200 million freight containers in the intermodal transportation between the major seaports around the world.

While containerized shipping brings great advantage to efficient and low cost freight shipment, it also opens the door to a variety of freight container related crime. Further, unsecured freight containers represent a global security threat. Terrorist attacks involving freight container transportation systems could cause an extended shutdown in freight deliveries, physical destruction, loss of life, and lost production in contaminated areas. Still further, freight containers are being used as a way to smuggle people undetected into countries, which will bring social instability to our society.

The integrity of freight shipments have become an important issue for governments, security agencies, ports, insurance companies, shippers, transportation companies, and the manufacturers who depend on the containerized supply chain to receive raw materials and deliver finished goods.

A wide variety of systems have been developed for detecting, analyzing and monitoring the contents of freight containers and the like. One such system is shown in published U.S. patent application No. 2003/01895190 to Anderton et al. The Anderton et al. system images the contents of containers. The system includes an imager arranged to receive millimeter wave radiation from a reception volume through a reception antenna, wherein the container is moving relative to the receive antenna. The reception volume is positioned such that the relative movement causes the reception volume to move through the container. Data from the antenna is recorded as the reception volume moves through the container. An image of the contents of the container is built up from the recorded data. The imager may be mounted in a portal for allowing relative positioning of the container and allowing relative speed to be controlled.

U.S. Pat. No. 5,910,973 to Grodzins relates to an inspection system for detecting the presence of a concealed item within an enclosure, such as a freight container. A beam of penetrating radiation is incident on the enclosure and detected by a detector disposed on the side of the enclosure opposite to the incident beam. By scanning the relative orientation of the enclosure with respect to the beam, the penetrating radiation transmitted through the enclosure is mapped, compared with known properties of the enclosure, and the presence of material concealed within the enclosure is determined.

U.S. Pat. No. 6,552,346 to Verbinski et al. relates to a system and method of density detection in a target object, such as a tanker truck. The system and method involve irradiating the target object, detecting a first and second discrete number of photons penetrating the target object through respective first and second prescribed volumes and entering respective first and second radiation detectors. First and second numbers of photons are detected by the first and second radiation detectors and are counted. A display output signal is generated in response to the first and second numbers. A graphical representation of the densities within the first and second volumes of the target object is displayed.

U.S. Pat. No. 5,524,133 to Neale et al. relates to a system for identifying materials using X-rays. The system detects the mean atomic number of a mass of material, for example freight in a vehicle. The method employed by the system involves subjecting the mass to X-rays and determining a first mean number passing there through. Thereafter, the mass is subject to higher energy X-rays and a second mean number is determined. The mean atomic number of the mass is determined from look-up tables against the ratio of the first mean number to the second mean number. The mass may be scanned by two linear accelerators arranged perpendicular to each other. Detector arrays are disposed respectively opposite the accelerators so that a three dimensional image can be built up of the mass.

U.S. Pat. No. 6,344,818 to Markov relates to a device to detect the presence of a target material. The device has a source module and a detector module. The source module includes a generator for producing a source signal corresponding to a characteristic frequency of the target material. The detection nodule detects a location of the target material wherein the detection module detects an interference signal generated between the source signal and a signal generated by the target material caused by the exposure to the source signal.

U.S. Pat. No. 6,647,091 to Fenkart et al. relates to an X-ray based inspection apparatus. Features of the apparatus include radiation locking with active curtains, continuous scanning utilizing an X-ray line scanner subsystem, and a CT scanner subsystem. The apparatus is used to inspect containers.

U.S. Pat. No. 6,047,588 to Danilychev relates to an air cargo container that a system for analyzing gases drawn from the container to detect the presence of contraband within any received cargo. Sensors on a housing of the container are used to confirm that an achieved interior pressure is substantially maintained over time.

U.S. Pat. No. 6,542,580 to Carver et al. relates to an X-ray imaging system for inspecting vehicles and containers. The inspection system includes a substantially rectangular frame having an X-ray imaging system disposed thereon. The frame is detachably connected to a conveyor mechanism which conveys a vehicle or container to be inspected through the imaging system.

U.S. Patent Application Publication Nos. 2003/0160701 and 2003/0164763, both to Nakamura et al., relate to a multifunction wireless self-organized sensor network system for the freight container security. The system uses proximity sensors to form a topological and geometrical network configuration to monitor a freight container boundary and the contents inside the freight container. U.S. Pat. No. 5,615,247 and Japanese patent publication No. 09-274077 also relate to security monitoring systems for freight container.

Despite the existence of these systems, there remains a need for an improved system, which can identify the contents of the freight container as well as ensure the security of the boundary and the contents of the freight container.

SUMMARY OF THE INVENTION

Accordingly, it is an object of the present invention to provide a freight container monitoring system and method which can be run in real time.

It is a further object of the present invention to provide a freight container monitoring system and method which can identify the contents of a freight container and enable a user to determine whether there are any sensitive materials present in the freight container or whether the contents loaded into a freight container conform with what were indicated on a loading manifest or a custom declaration.

It is still a further object of the present invention to provide a freight container monitoring system and method which can generate a loading diagram of a freight container which can be saved for future comparison.

It is also a further object of the present invention to provide a freight container monitoring system and method which can generate a resonant spectrum of a freight container which can be saved for future comparison.

It is yet a further object of the present invention to provide a freight container monitoring system and method which can generate a polarity configuration of internal surfaces of a freight container which can be saved for future comparison.

The foregoing objects are attained by the freight container monitoring system and method of the present invention.

In accordance with the present invention, a freight container monitoring system broadly comprises means for identifying contents of the freight container and for forming a loading diagram of the freight container using wideband electromagnetic impulse signals, and means for saving the loading diagram for future comparison purposes. The system also comprises means for generating a resonant spectrum representative of an initial condition of internal surfaces and contents of the freight container, and means for saving the resonant spectrum for future comparison purposes. The system further comprises means for detecting any shifting of the contents using special polarized electromagnetic impulse signals, and means for saving a polarity configuration for future comparison purposes.

Further, in accordance with the present invention, a method for monitoring a freight container broadly comprises the steps of identifying the contents of the freight container, generating a loading diagram of the contents, and saving the loading diagram for future comparison purposes. The method further comprises the steps of verifying if any sensitive materials are present in the freight container and verifying if the contents loaded into the freight container conform to what were declared on a loading manifest or a custom clearance. The method further comprises the steps of generating a second loading diagram and comparing the second diagram with the initial diagram upon receiving a command from a monitoring center for a random inspection or from a system central processing unit (CPU) to verify a panpanpan status.

Also further, in accordance with the present invention, the method further comprises the steps of generating a resonant spectrum representative of an initial condition of internal surfaces and contents of the freight container, and saving the resonant spectrum for future comparison purposes. The method further comprises the steps of generating a second resonant spectrum and comparing the second resonant spectrum with the initial resonant spectrum to determine whether there has been any tampering with the freight container.

The method further comprises the steps of generating a polarity configuration of internal surfaces of a freight container which can be saved for future comparison. The method further comprises the steps of detecting any shifting of the contents of the freight container during transport. The method further comprises the steps of generating a second polarity configuration and comparing the second polarity configuration with the initial polarity configuration upon receiving a command from a monitoring center for a random inspection or from the system CPU to verify a panpanpan status.

Other details of the freight container monitoring system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention relates to a system and method for monitoring the boundary and the contents of freight containers. As used herein, the term "freight container" includes, but is not limited to, an intermodal freight container, a compartment on a vehicle in which miscellaneous items could be stored, a train car, a truck, and an aircraft freight container. While the present invention will be described in the context of a freight container, it should be apparent that it can be used with any closed finite space in which one has an interest.

The system and method of the present invention are designed to allow a freight container to be pre-screened before it leaves the port of loading or otherwise enter the flow of commerce. The system and method of the present invention also enable identification of the contents of a freight container to alert one of the possible presence of sensitive materials, such as radioactive, biological, and explosive materials. They also enable a comparison of the actual contents of a freight container with what were declared on a loading manifest or a custom declaration for the freight container. Still further, the system and method of the present invention enable a loading diagram of the contents of the freight container to be generated and saved for future comparison, i.e. when the freight container is requested for a random inspection by a monitoring center or for a panpanpan status verification by a system CPU.

The system and method of the present invention are also designed to allow a freight container to be real-time monitored during its transport to ensure the integrity of the freight container after an initial inspection. The system and method also enable the generation of an initial resonant spectrum of the boundary and contents of the freight container and the saving of such spectrum for future comparison purposes. The system and method further enable the generation of a second spectrum during the transport and the detection of any illegal tampering with the freight container by comparing the second spectrum with the initial spectrum.

The system and method of the present invention are further designed to allow a freight container to be real-time monitored during its transport to ensure the safety of the contents of the freight container after the initial inspection. The system and method enable the generation of an initial polarity configuration of the surfaces and contents of the freight container and the saving of said configuration for future comparison purposes. The system and method further enable the generation of a second polarity configuration during transport and the detection of any abnormal shifting of contents of the said freight container.

In a first aspect, the system of the present invention includes means for contents pre-screening, which is to identify the contents and find the location of the contents in the freight container. By using the above available information, the system will be able to tell if there is any possible presence of sensitive materials and if the contents of freight container conform to what were declared on a loading manifest or a custom clearance, and further, if the freight container needs a secondary inspection. Based on the above available information, a loading diagram can be generated and saved for future comparison purposes. In the event of a random inspection or system CPU request to confirm a panpanpan status, by using the loading diagram generation means at that moment, one may find the changes in the loading diagram by comparing the initial loading diagram with the loading diagram at that moment.

Figure 3:
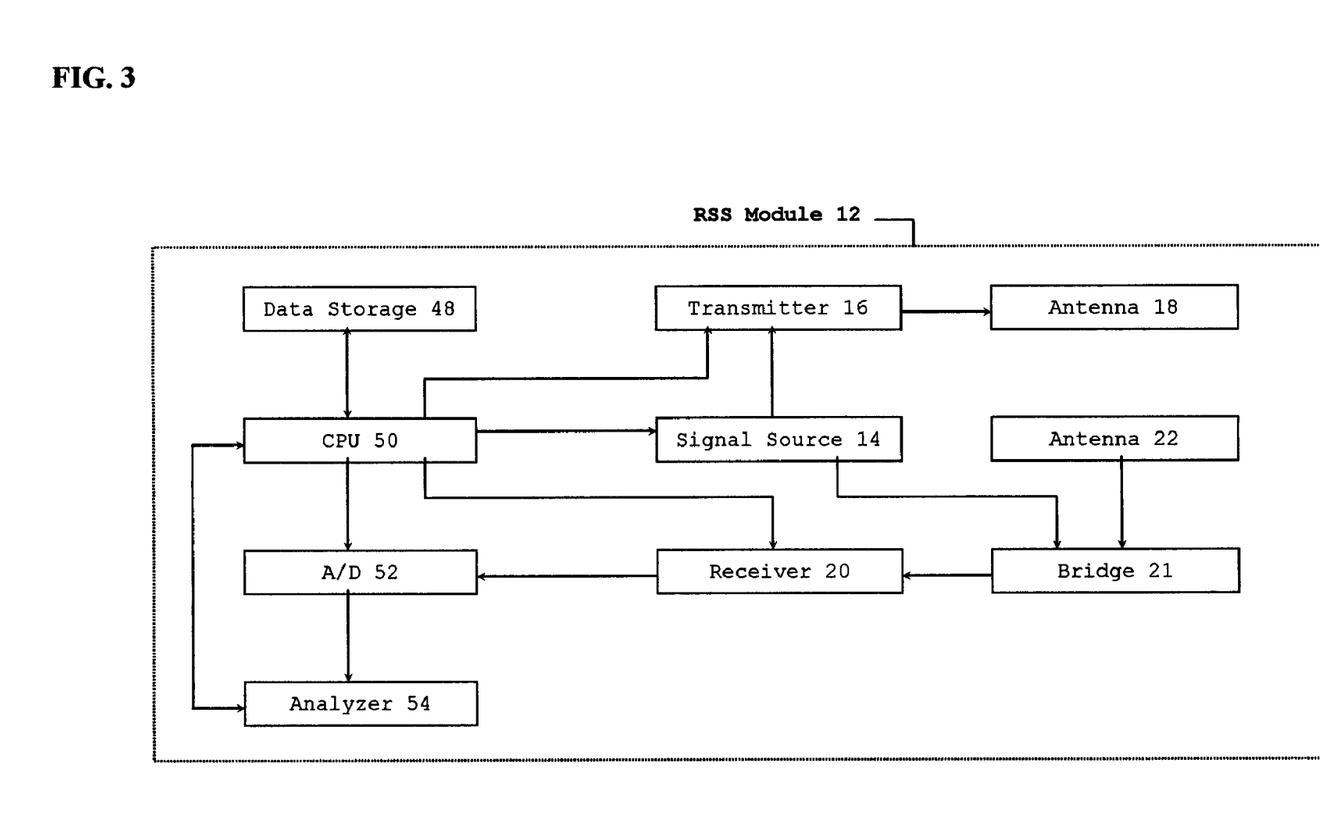
FIG. 3 is a schematic representation of a radio structural scanning (RSS) module for identifying the contents and generating the loading diagram of the freight container.

The system 10 of the present invention has a RSS module 12 for detecting and identifying the contents of the freight container. As shown in FIG. 3, the RSS module 12 uses an electromagnetic signal, such as a wideband electromagnetic impulse signal, to detect and identify the contents of the freight container. The module 12 includes a source 14 for generating an electromagnetic signal in a desired frequency range, such as in the range of from 10 MHz to 100 GHz, a transmitter 16 for sending the signal to an antenna 18 for transmitting the signal to the inner space of the freight container, a central processing unit (CPU) 50 for coordinating the signal generation, controlling signal transmitting and receiving, and data processing and storing, a receiver 20 for receiving the signal from a bridge 21 for receiving the signal from an antenna 22 which receives a signal from the inner space of the freight container and coupling the signal from a signal source 14, an analog/digital converter (A/D) 52 for converting an analog signal to a digital signal, an analyzer 54 for analyzing the digital signal to form a returned signal spectrum and for sending the spectrum to the CPU 50 for processing and then through the CPU 50 to a data storage 48 for storage. The analyzer 54 may use any suitable mathematical technique known in the art, such as Fourier transform, to analyze the digital data to form the spectrum. The CPU 50 may be any suitable processing unit known in the art and may be programmed using any suitable language known in the art. The electromagnetic signal which is generated by the module 12 may be a wideband electromagnetic impulse signal in the aforementioned frequency range having an impulse width from 100 ns to 10 ps.

Figure 6A:
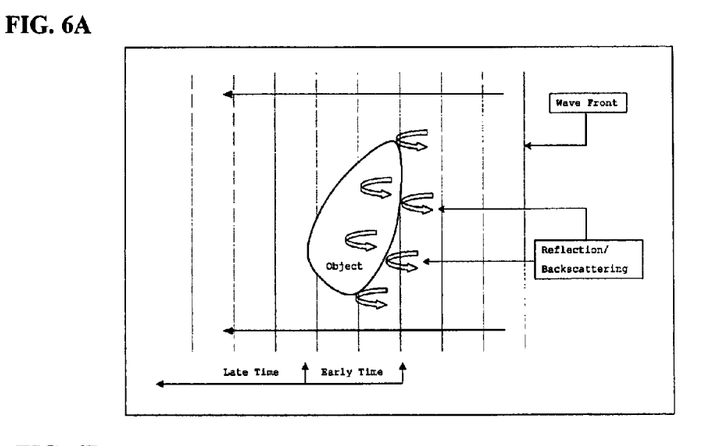
FIG. 6A illustrates the manner in which a time domain spectrum is generated.
Figure 6B:
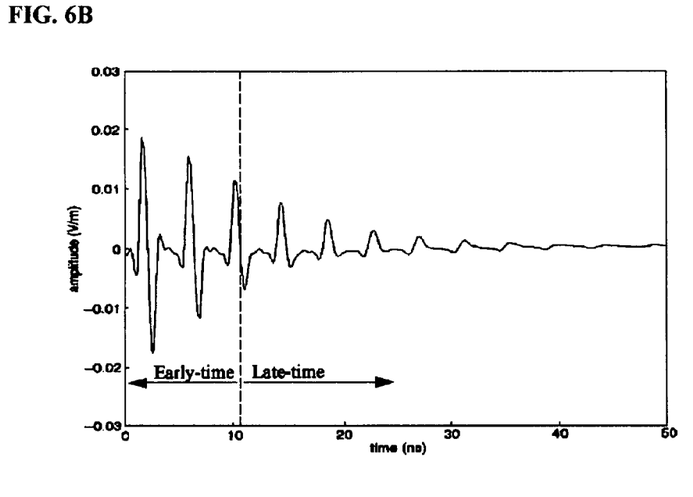
FIG. 6B is a time domain spectrum of a returned signal from the internal space of freight container.

As shown in FIGS. 6A & 6B, the returned signal can be detected and analyzed in time domain and time-frequency domain. By analyzing the returned signal, useful information, such as the position and permittivity characteristics of the contents inside the freight container which caused the reflection and refraction can be obtained. By knowing the different permittivity existing inside the freight container, one will able to identify what kind of materials that permittivity correspond to, and by characterizing the sensitive materials which lead to high-risk freight container category classification, one will be able to tell if the freight container is possibly loaded with such sensitive materials. Furthermore, by comparing what is found inside the freight container with what was declared on a loading manifest or a custom declaration, one will be able to tell the integrity of the freight container. In the event, sensitive materials have been located, by knowing the location of such materials inside the freight container, one will be able to enforce more accurately targeted secondary inspection.

One of the benefits of the RSS module 12 is that one can generate a loading diagram of the freight container and store it in a computer in a monitoring center for later comparison during the transport. Since the loading of each container will be different, each container should have a singular loading diagram.

In a second aspect, the system of the present invention includes means for real-time monitoring of the internal boundary surfaces of the freight container as well as the contents inside the freight container. The internal boundary surfaces and contents monitoring means generate the initial resonant spectrum of the internal boundary surfaces and contents of the freight container. By using the internal boundary surface and contents monitoring means at a future time, the resonant spectrum for the then existing internal boundary surfaces and contents of the freight container can be generated at that time. By comparing the then internal boundary surfaces and contents resonant spectrum with the initial resonant spectrum, one can determine if there has been a change on the internal boundary surfaces or the contents inside the freight container have been altered in any way. As can be imagined, the system enables one to tell if there has been any tampering with the freight container since the initial inspection and generation of the initial resonant spectrum.

Figure 4:
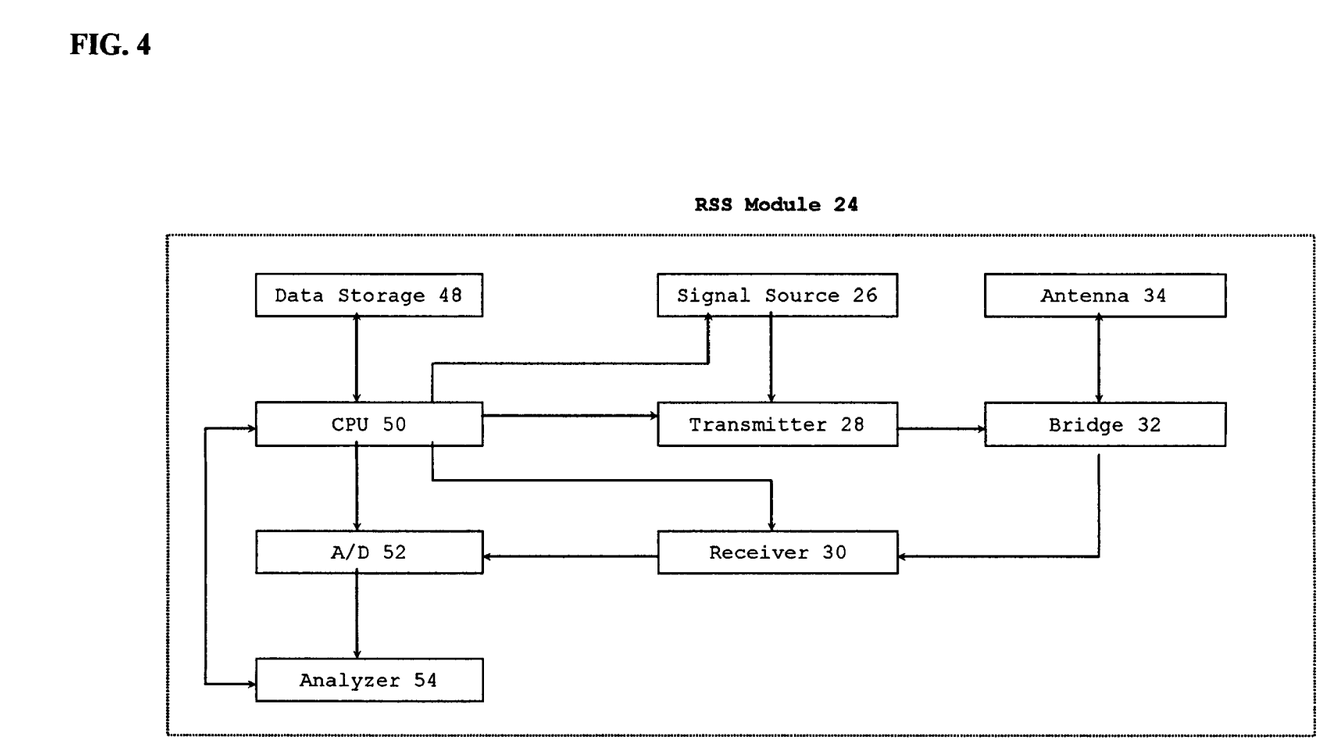
FIG. 4 is a schematic representation of a RSS module for generating a resonant spectrum of the condition of internal surfaces and contents of a freight container.

Thus, the system 10 of the present invention also has a RSS module 24 for monitoring the internal boundary surfaces and contents of a freight container. As shown in FIG. 4, the RSS module 24 includes a source 26 for generating an electromagnetic sweeping signal in a desired frequency range, such as in the range of from 10 MHz to 10 GHz, and a transmitter 28 for sending the electromagnetic sweeping signal to a bridge 32 for transmitting the electromagnetic sweeping signal through an antenna 34, which antenna 34 transmits a signal from the transmitter 28 to and receives a return signal from the internal space of a freight container. The bridge 32 also sends the return signal received from antenna 34 to the receiver 30. The module 24 also has a CPU 50 for coordinating the signal generation, controlling signal transmitting and receiving, and data processing and storing, an A/D converter 52 for converting an analog signal to a digital signal, an analyzer 54 for analyzing the digital signal to form a resonant spectrum and sending the resonant spectrum to the CPU 50 for processing and then through CPU 22 to a data storage 48 for storage and later retrieval. The analyzer 54 may use any suitable technique known in the art for forming the resonant spectrum. The CPU 50 may comprise any suitable processing unit known in the art and may be programmed using any suitable language known in the art. The signal generated by the module 24 may be a modulated continuous electromagnetic sweeping signal with a frequency range from 10 MHz to 100 GHz.

Figure 2:
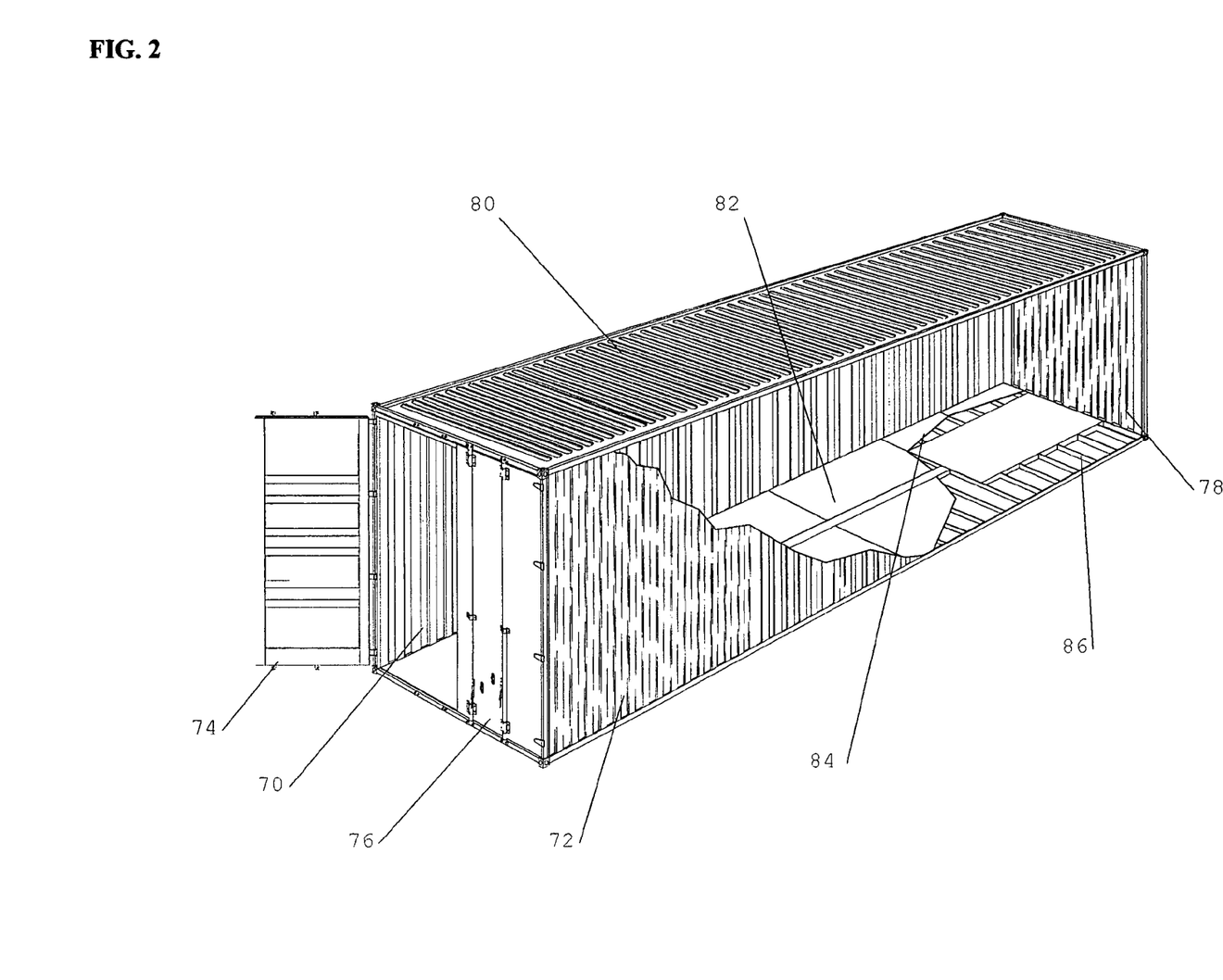
FIG. 2 illustrates the structure of a freight container.

As shown in FIG. 2, most freight containers are a rectangular box with a left wall 70, a right wall 72, front doors 74 and 76, a back wall 78, a top wall 80 made of sheet metal and a bottom wall 82 with a wood floor 84 covered on a metal frame 86. The most commonly used freight containers come in two sizes. The inner size of a first type of freight container(A) typically comes with a height of 2.39 m, a width of 2.35 m, and a length of 12.06 m. The inner size of a second type of container(B) comes with a height of 2.39 m, a width of 2.35 m, and a length of 5.90 m. According to these dimensions, the resonant frequency for each of those freight containers can be calculated using the following equations:

$$f = \frac{C}{2\sqrt{\varepsilon_r \mu_r}} \times \left( \frac{k^2}{l^2} + \frac{m^2}{a^2} + \frac{n^2}{b^2} \right)^{\frac{1}{2}} \quad k, m, n = 0, 1, 2 \cdots$$

where C is the speed of light, l is the length, a is the height, b is the width, and f is the resonant frequency
(A): for the $S_{1,1,0}$ mode, $f=65.8/\sqrt{\varepsilon_r \mu_r}$ (MHz)
(B): for the $S_{1,1,0}$ mode, $f=69.3/\sqrt{\varepsilon_r \mu_r}$ (MHz)
where $\varepsilon_r$, $\mu_r$ are the effective relative permittivity and permeability constant for the contents inside the freight container. For non-magnetism materials, $\mu_r=1$.

Based on the resonant frequency obtained from the above formulas, and considering the bottom floor frame opening size, it has been found during the experiment that the resonant formants appeared when the sweeping signal frequency range was set from 100 MHz to 800 MHz. The signal could have a wave length between 0.375 M and 3.0 M.

Figure 7A:
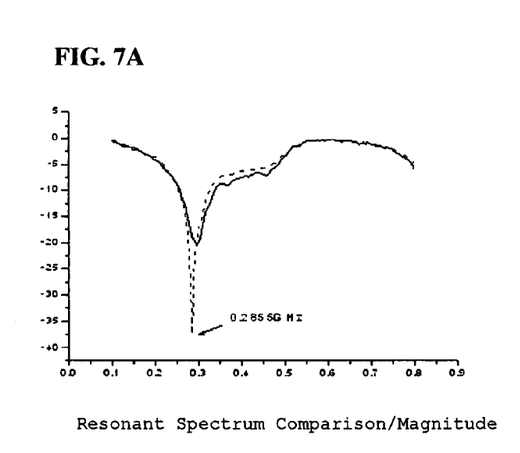
FIGS. 7A through 7D are resonant spectrums of a loaded container when the door locking bar is in the locking position, when the door locking bar is out of the locking position, and the subtracting result.
Figure 7B:
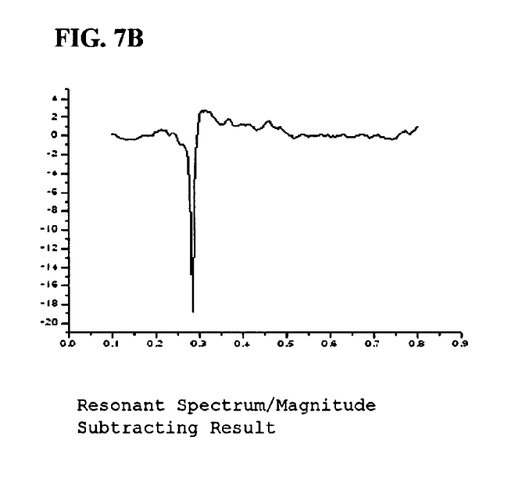
Figure 7C:
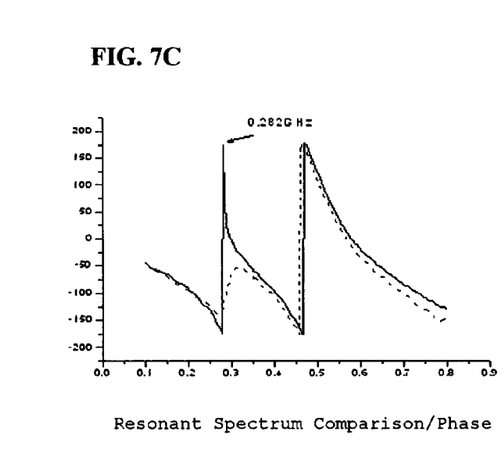
Figure 7D:
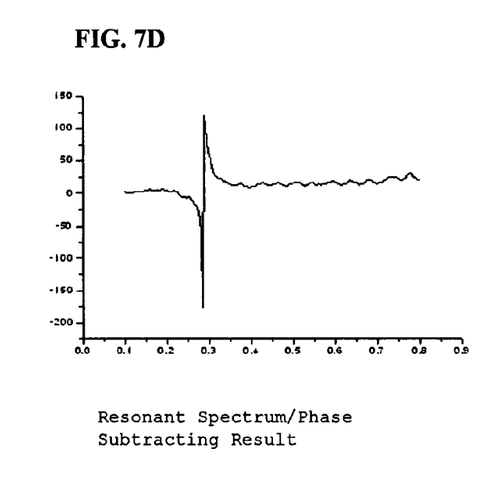

In the event of any illegal intrusion into the container, due to damage made to the boundary of the freight container walls or the floor, the initial resonant condition will no longer be valid. In term of the resonant formants, this means that the initial resonant formants disappear from the corresponding resonant frequencies. The resonant spectrum is singular for an loaded container. Therefore, by observing the resonant spectrum of the freight container, one will be able to monitor the boundary of the freight container and provide a power security measure to prevent the container from illegal intrusion. FIGS. 7A to 7D illustrate resonant spectrums which can be generated using the module 24. The solid line in FIGS. 7A and 7B represent the spectrum generated while the door is in an unlocked position and the dotted lines represents the spectrum generated while the door is in a locked position. FIGS. 7C and 7D are the resonant spectrums for magnitude and phase generated by subtracting the result from 7A and 7B.

It has been learned that some resonant formants will disappear if a door of a freight container is unlocked and opened or when the freight container has been lifted up from a flat bed. Similarly, any damage to the container will cause the same response.

The initial resonant spectrum generated by the RSS module 24 may be stored in data storage 48 for further recall and comparison. As designed, the resonant spectrum generated for a particular freight container will be sent to a monitoring center 100 so that the monitoring center can determine whether any intrusion has taken place during the transport.

In a third aspect, the system of the present invention includes means for real-time monitoring of the shifting of the contents of the freight container. The content shifting monitoring means generates an initial polarity configuration of the surfaces and contents of the freight container and saves the initial polarity configuration for future comparison purposes. By using the content shifting monitoring means at a future time, the polarity configuration at sight could be generated to compare with the initial polarity configuration to detect the abnormal shifting of the contents of the said freight container.

Figure 5:
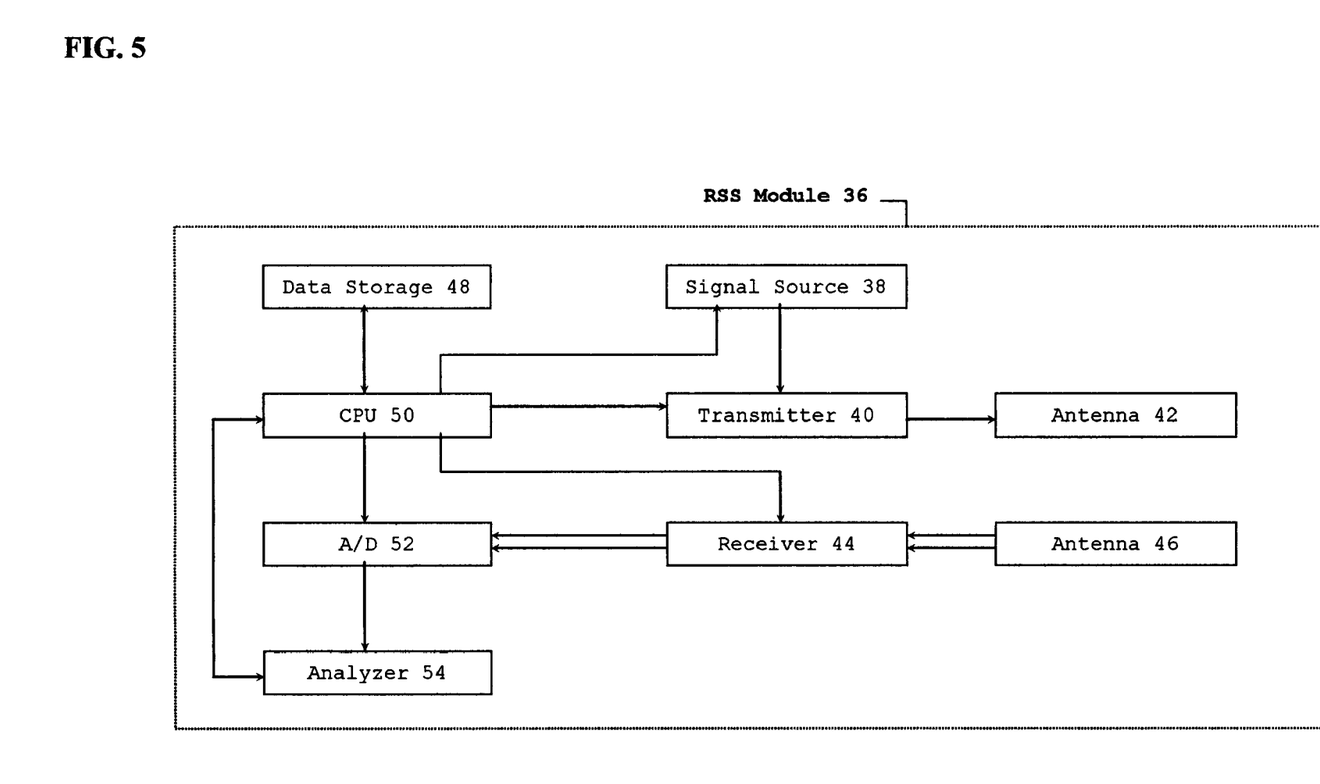
FIG. 5 is a schematic representation of a RSS module for generating a polarity configuration determining the surface condition inside the freight container.

Thus, the system 10 of the present invention further includes a RSS module 36, which utilizes polarity contribution analysis methods to determine whether there is possible human smuggling, or dangerous cargo shifting inside the freight container. As shown in FIG. 5, The RSS module 36 includes a source 38 for generating an electromagnetic signal, such as a wideband electromagnetic impulse signal, in a desired frequency range, such as in the range of from 10 MHz to 100 GHz, and a special polarization mode, such as fixed direction polarized, a transmitter 40 for sending the signal to an antenna 42 for transmitting the signal to the internal space of the freight container, a CPU 50 for coordinating the signal generation, control of signal transmission and receiving and data processing and storing, a receiver 44 for receiving the signal from an antenna 46 which receives the signal from the internal space, an A/D converter 52 for converting an analog signal to a digital signal, an analyzer 54 for analyzing the digital signal to form the polarity configuration and to send the polarity configuration to the CPU 50 for processing and then through the CPU 50 to a data storage 48 for storing. The analyzer 54 analyzes the digital data using any suitable mathematical technique known in the art to separate the two perpendicular direction magnitudes to specify the polarity configuration. The CPU 50 may comprise any suitable processing unit known in the art and may be programmed using any suitable language known in the art. If used, an electromagnetic wideband impulse signal may have an impulse width from 100 ns to 10 ps.

Figure 8:
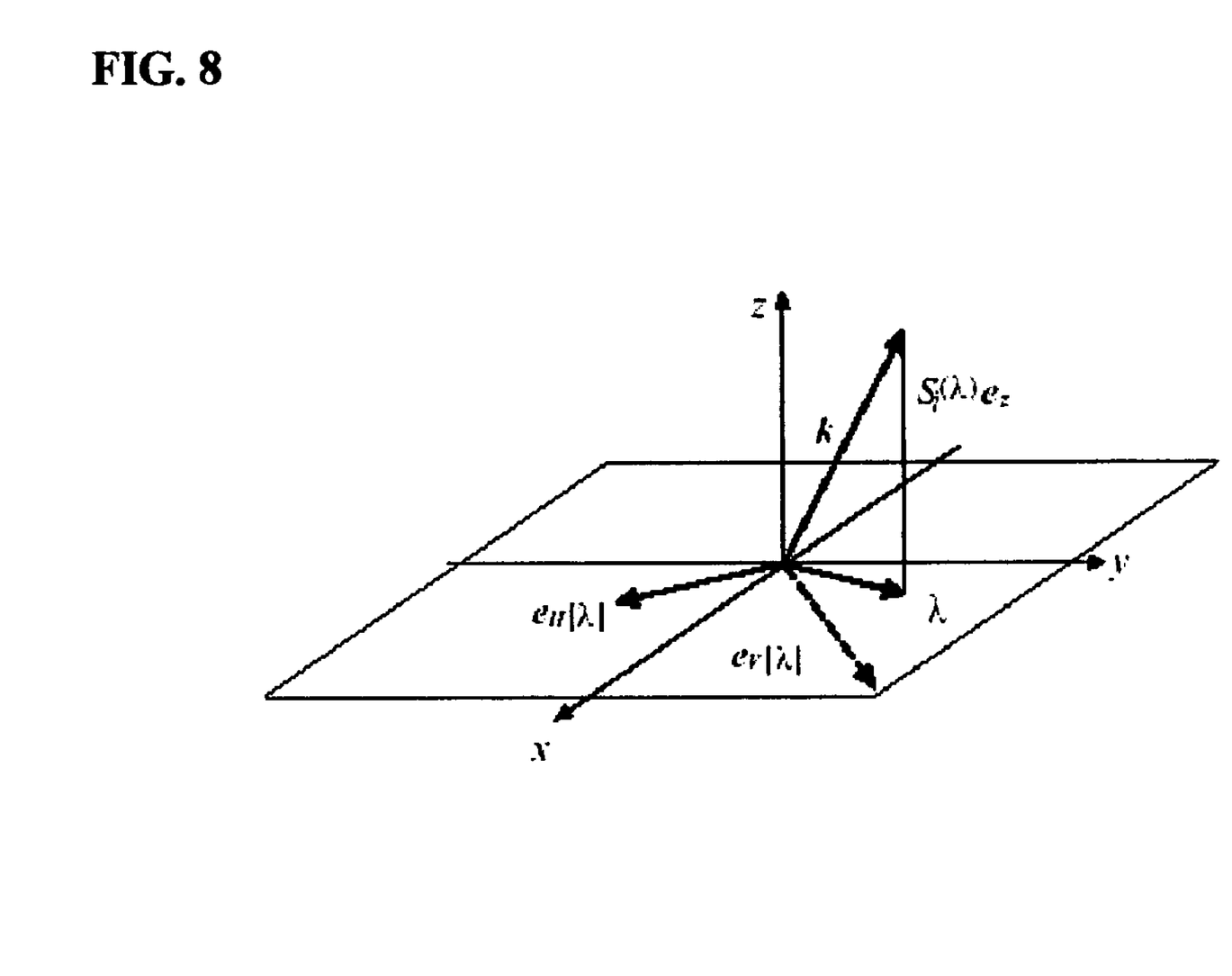
FIG. 8 illustrates the polarity configuration of a returned signal from the internal space of a freight container.

The RSS module 36 is used to determine the polarity configuration of the returned signal. As shown in FIG. 8, for a fixed direction polarized electromagnetic signal, the polarity is specially distributed on both directions. When it is reflected by the different contents surfaces inside the freight container and the metal boundary walls of the freight container, the polarity of the returned signal will be uniquely distributed on both directions according to the boundary walls condition and the content layout condition inside. That is, for certain boundary walls condition and content layout condition inside, the polarity configuration of the returned signal is uniquely distributed in both directions. With the identical polarity information provided by this module, by using the polarity configuration generating means at a future time, comparing the polarity configuration at the moment with the initial polarity configuration, one may determine whether the content inside the freight container has shifted as of this moment. Using this capability, one can determine whether there is human smuggling or dangerous shifting cargos inside the freight container.

Figure 1:
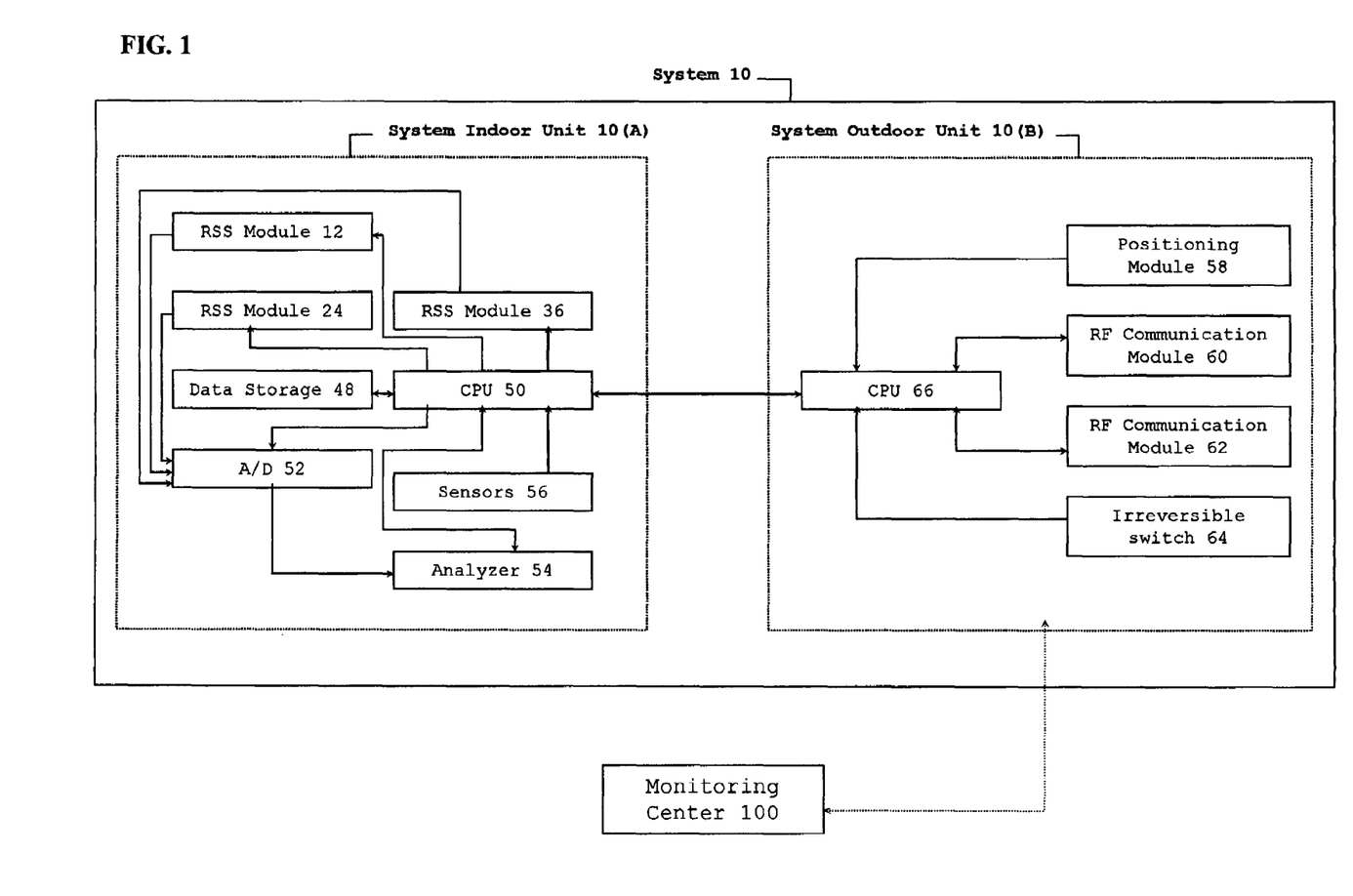
FIG. 1 is a schematic representation of a system for monitoring a freight container in accordance with the present invention.

Referring now to FIG. 1, each of the RSS modules 12, 24, and 36 is a part of an indoor unit 10A. The indoor unit 10A comprises each of the antennas in a particular module being mounted internally of the freight container, preferably on the interior and right side center of the door 74. The positioning module 58, the RF communication modules 60 and 62, and the irreversible switch 64 form an outdoor unit 10(B), which may be locked through a hole on the locking handle fixed on the exterior of the door 76. The indoor unit 10A may be connected to the outdoor unit 10B by a data cable. All system data is stored in the indoor unit 10B, if desired, the data can be sent through RF communication modules of the outdoor unit 10A to a monitoring center 100 in a remote location. Data exchange between the system 10 and the monitoring center 100 may be done by either mobile communication or short range local radio communication.

The positioning module preferably uses a chipset, such as Garmin GPS15, to fulfill a positioning function. The chipset receives a signal from three satellites to determine the location coordinates of the freight container and the time. It sends the data to CPU 66.

The RF communication module 60 preferably uses a chipset, such as a Siemens TC35, to fulfill a mobile communication function. In operation, the chipset communicates with the monitoring center 100 during transport of the freight container in a remote area where a short range local RF communication is not available, mainly for data exchange between the system 10 and the monitoring center 100.

The RF communication module 62 preferably uses a chipset, such as Chipcon CC1000, to fulfill short range local radio communication functions. In operation, the chipset communicates with the monitoring center 100 during transport in an area where short range local RF communication is available, mainly for data exchange between the system 10 and monitoring center 100.

Irreversible switch 64 is a mechanical switch with only "ON" switching by inserting a bolt or cable end to the irreversible locking position. The switch 64 turns on the power supply (not shown) for the system 10.

While each of the modules has been shown in FIGS. 3–5 as having only one or two antennas, if desired each of the modules may have more than what was/were shown in FIGS. 3–5, such as four antennas. In such a situation, at least one of the antennas may be used to transmit the signal to the inner space of the freight container, and at least one of the antennas may be used to receive a returned signal from the inner space of the freight container to a receiver.

Figure 9:
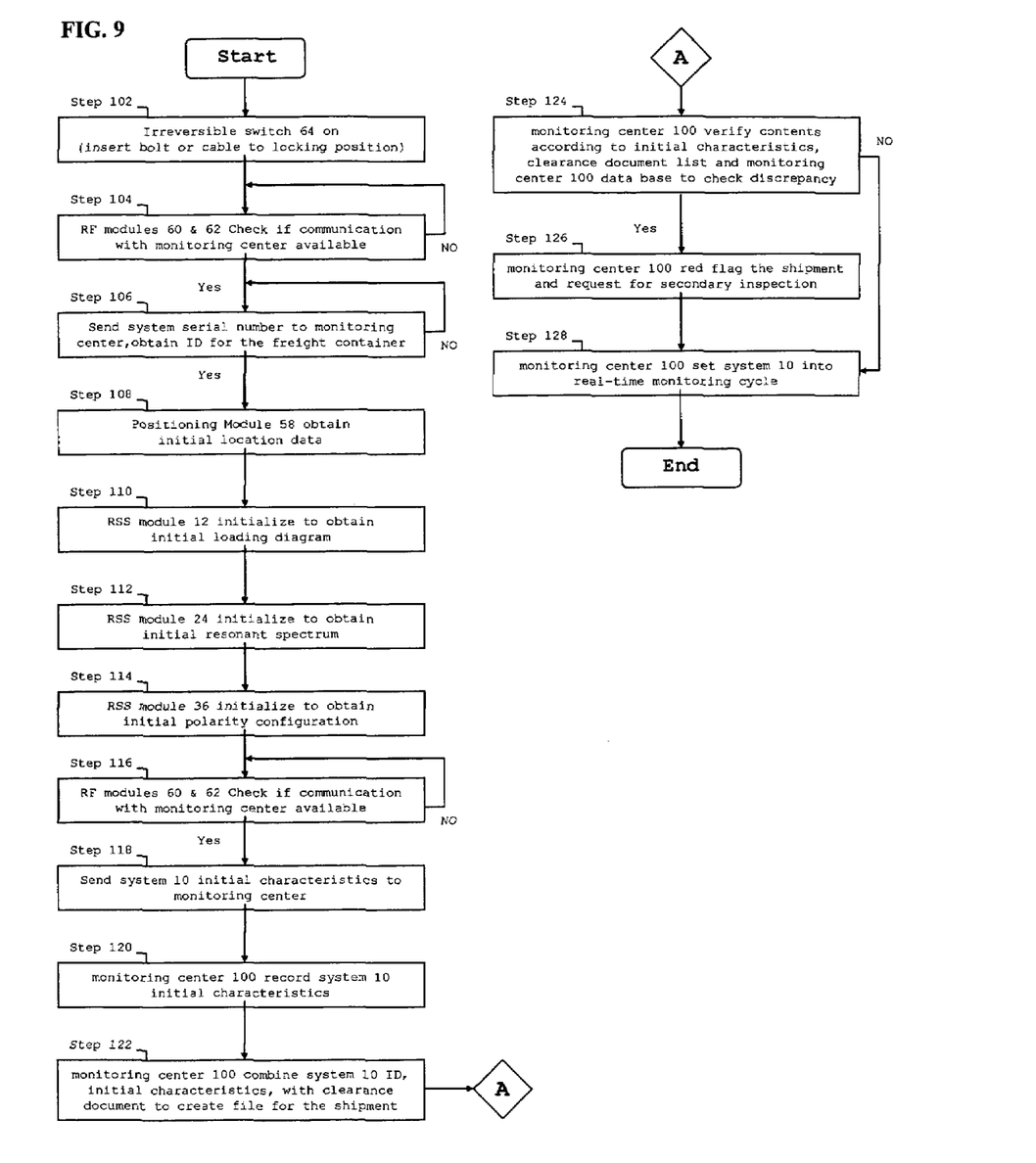
FIG. 9 is a flowchart of the generation of initial characteristics of the freight container.

Referring now to FIG. 9, the initial characteristics of the freight container are set using the following method steps. In step 102, the irreversible switch 64 is set to on (by inserting bolt or cable to locking position). In step 104, RF modules 60 and 62 check to see if communication with the monitoring center 100 is available. In step 106, the system serial number is sent to the monitoring center 100 to obtain an identification number (ID) for the freight container. In step 108, positioning module 58 obtains initial location data. In step 110, RSS module 12 is initialized to obtain an initial loading diagram. In step 112, RSS module 24 is initialized to obtain an initial resonant spectrum. In step 114, RSS module 36 initializes to obtain an initial polarity configuration. In step 116, RF modules 60 and 62 check to see if communication with monitoring center 100 is available. In step 118, the system 10 sends the initial characteristics to the monitoring center 100. In step 120, the monitoring center records or saves system 10 initial characteristics. In step 122, the monitoring center 100 using a pre-programmed CPU combines system 10 ID and initial characteristics with clearance document to create a file for the shipment in the freight container. In step 124, the monitoring center 100 verifies contents according to initial characteristics, clearance document list, and monitoring center data base to check for discrepancies. In step 126, the monitoring center 100 red flags the shipment and requests secondary inspection if any discrepancies or irregularities are found. In step 128, the monitoring center 100 sets the system 10 into a real-time monitoring cycle.

Figure 10:
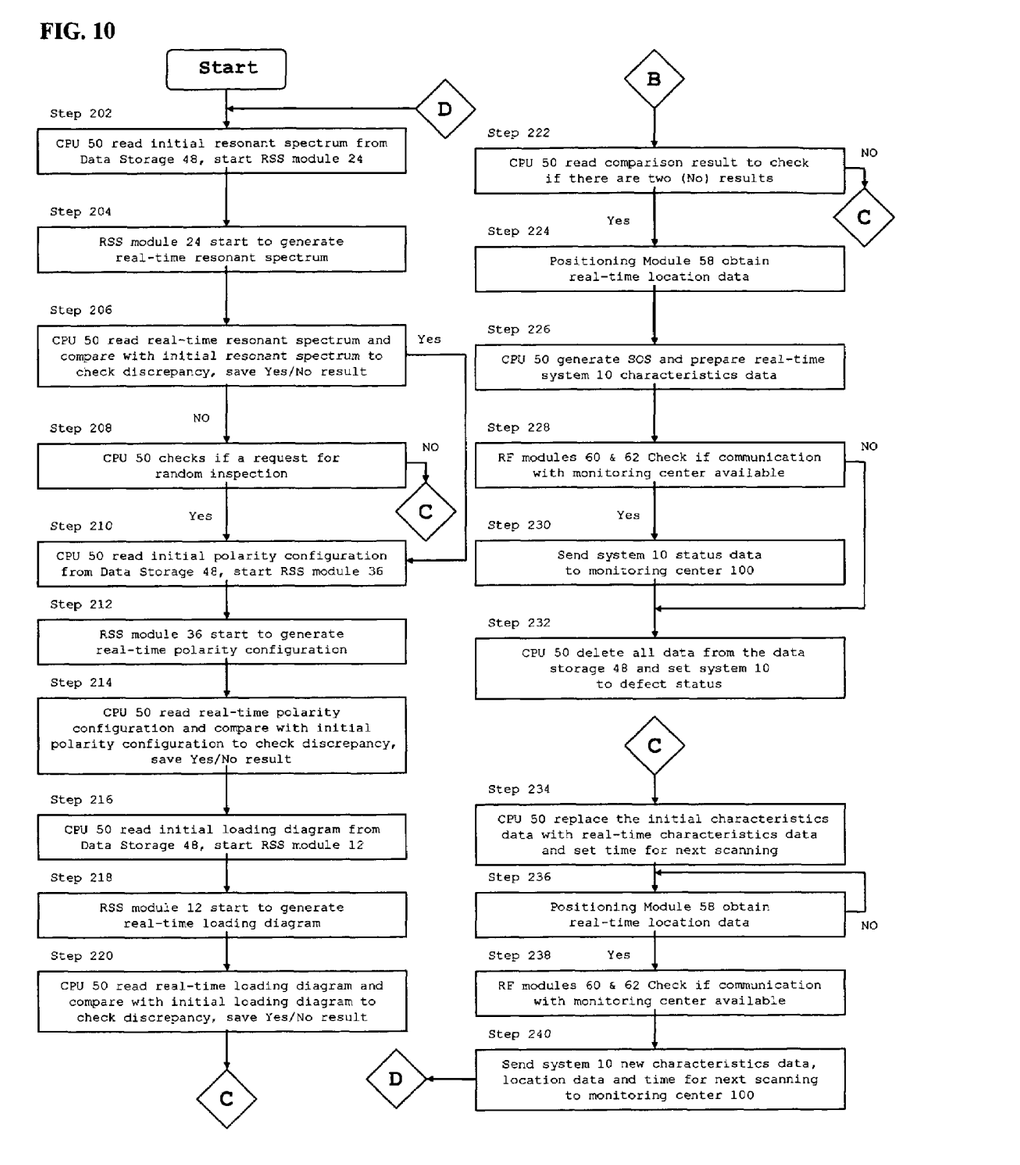
FIG. 10 is a flowchart of the real-time monitoring of freight container.

FIG. 10 is a flowchart of the real-time monitoring cycle set in motion by the monitoring center 100. As shown in step 202, CPU 50 reads the initial resonant spectrum from data storage 48 and starts RSS module 24. In step 204, RSS module 24 starts to generate a real-time resonant spectrum. In step 206, CPU 50 reads the real-time resonant spectrum and compares it with the initial resonant spectrum to check for discrepancies or irregularities. The Yes/No result is then saved by CPU 50. If the answer is yes, then the method goes to step 210, CPU reads the initial polarity configuration from data storage 48 and starts the RSS module 36. In step 212, RSS module 36 starts to generate a real-time polarity configuration. In step 214, CPU 50 reads the real-time polarity configuration to check for discrepancies or irregularities. The Yes/No result is saved. In step 216, CPU 50 reads the initial loading diagram from data storage 48 and starts RSS module 12. In step 218, RSS module 12 starts to generate a real-time loading diagram. In step 220, CPU 50 reads the real-time loading diagram and compares it with the initial loading diagram to check for discrepancies or irregularities. The Yes/No result is saved. In step 222, CPU 50 reads comparison result to check if there are two (No) results. If the answer is no, then the method goes to step 234. In step 234, CPU 50 replaces the initial characteristics data with real-time characteristics data and sets the time for the next scan. In step 236, positioning module 58 obtains real-time location data. In step 238, RF modules 60 and 62 check if communication with the monitoring center 100 is available. In step 240, the system 10 sends new characteristics data, location data and time for next scanning to monitoring center 100. From step 240, the method returns to step 202.

If the answer to step 222 is yes, the method proceeds to step 224. In step 224, positioning module 58 obtains real-time location data. In step 226, CPU 50 generates an mayday status signal and prepares real-time system 10 characteristic data. In step 228, RF modules 60 and 62 check if communication with monitoring center 100 is available. If the answer to step 228 is yes, then the method follows to step 230, system 10 sends status data to monitoring center. In step 232, the CPU 50 deletes all data from the data storage 48 and sets system 10 to Mayday status. And if the answer to step 228 is no, then the method goes directly to step 232.

If the answer to step 206 is no, then the method follows to step 208, in step 208, CPU 50 checks if a request for random inspection is generated or a request for random inspection from monitoring center 100 is received. If the answer to step 208 is yes, then the method goes to step 210 and follows on after step 210, if the answer to step 208 is no, then the method goes to step 234 and follows on after step 234.

If desired, as shown in FIG. 1, the system 10 may include one or more special function sensors 56, such as a photo-ionization sensor and/or an organic vapor sensor, to sense sensitive materials in the contents of the freight container.

As can be seen from the foregoing discussion, the system and method of the present invention may be employed immediately after a freight container has been loaded and its doors have been closed and sealed, one can see the many advantages associated with the freight container monitoring system and method of the present invention. Included in these advantages is the ability to reach a 100% inspection rate without causing extreme congestion in the seaport based on that the monitoring system and method are able to spread the prescreening inspection over the time and location other than only after the freight container's arrival in the seaport, and this gives us enough time to prescreen every single container to red flag the problem freight containers for a targeted secondary inspection after their arrival in the seaport and to give normal freight containers fast clearance upon their arrival, this will also give us great advantages to maximizing the existing man power and equipment to fulfill the ultimate goal, 100% inspection, more accurate and restrict secondary inspection, faster clearance procedure and real-time door to door monitoring.

It is apparent that there has been provided in accordance with the present invention a freight container monitoring system which fully satisfies the objects means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system for monitoring a freight container comprising:
   means for monitoring the freight container including means for generating a resonant spectrum representative of an initial condition of internal surfaces and contents of the freight container; and
   means for saving said resonant spectrum for future comparison purposes.

2. A system according to claim 1, wherein said resonant spectrum generating means comprises means for generating an electromagnetic signal in a desired frequency range, means for outputting the generated signal to a bridge, said bridge transmitting said signal through an antenna, and said antenna transmitting the generated signal to an internal space of said freight container and receiving a returned signal from said internal space of said freight container.

3. A system according to claim 2, further comprising means for controlling signal transmission and reception and data processing and storing, means for converting said returned signal from an analog signal to a digital signal, and means for forming said resonant spectrum from said digital signal.

4. A system according to claim 2, wherein said signal generating means comprises means for generating a signal in the frequency range of from 10 MHz to 10 GHz.

5. A system for monitoring a freight container according to claim 1, further comprising:
   means for generating a loading diagram representative of initial contents of the freight container; and
   means for saving said loading diagram for future comparison purposes.

6. A system for monitoring a freight container according to claim 5, wherein said loading diagram generating means comprises means for identifying the contents of said freight container using an electromagnetic signal.

7. A system according to claim 6, wherein said contents identifying means comprises means for generating an electromagnetic signal in a desired frequency range, means for outputting said electromagnetic signal, means for transmitting the generated signal to an internal space of said freight container, means for receiving a returned signal from said internal space of said freight container, means for receiving the returned signal and coupling the source signal and means for inputting said returned signal and said source signal.

8. A system according to claim 7, further comprising means for controlling signal transmission and reception and data processing and storing, means for converting said input signal from an analog signal to a digital signal, and means for forming said loading diagram from said digital signal.

9. A system according to claim 6, wherein said signal generating means comprises means for generating an electromagnetic signal in the frequency range of from 10 MHz to 100 GHz.

10. A system for monitoring a freight container according to claim 1, further comprises means for detecting shifting of the contents of said freight container.

11. A system for monitoring a freight container according to claim 10, wherein said shifting detection means comprises:
    means for generating a polarity configuration representative of contents of the freight container; and
    means for saving said polarity configuration for future comparison purposes.

12. A system for monitoring a freight container according to claim 11, wherein said polarity configuration generating means comprises means for generating an electromagnetic signal in a frequency range and a special polarization mode, means for outputting said electromagnetic signal, means for transmitting said electromagnetic signal to an internal space of said freight container, means for receiving a returned signal from said internal space of said freight container, and means for inputting said returned signal.

13. A system according to claim 12, further comprising means for controlling signal transmission and reception and data processing and storing, means for converting said returned signal from an analog signal to a digital signal, and means for forming said polarity configuration from said digital signal.

14. A system according to claim 12, wherein said signal generating means comprises means for generating an electromagnetic signal in the frequency range of from 10 MHz to 100 GHz and in a fixed direction polarized mode.

15. A system for monitoring a freight container according to claim 1, further comprising means for detecting a real-time position of the freight container.

16. A system for monitoring a freight container according to claim 1, further comprising means for RE communication with a monitoring center in a remote location.

17. A system for monitoring a freight container according to claim 1, further comprising means for sensing sensitive materials.

18. A system for monitoring a freight container comprising:
    means for identifying contents of the freight container to enable comparison with the contents declared on a document list and for detecting possible sensitive materials in the contents on board the freight container;
    means for real-time monitoring boundary walls of the freight container for detecting possible tampering with the freight container;
    means for real-time monitoring of a layout configuration for the contents of the freight container to detect at least one of possible contents dangerous shifting and human smuggling; and
    means for performing real-time communicating with a monitoring center to red flag any problem freight container for targeted secondary inspection, to easy pass a normal freight container, and to request random inspection.

19. A method for monitoring a freight container comprising the steps of:

monitoring said freight container;

said monitoring step comprising generating a first resonant spectrum representative of an initial condition of internal surfaces and contents of the freight container; and saving said resonant spectrum for future comparison purposes.

20. A method according to claim 19, further comprising:

generating a second resonant spectrum representative of a condition of said internal surfaces and contents of the freight container; and comparing said second resonant spectrum with said first resonant spectrum to determine whether there has been any change in said condition of said internal surfaces and contents of said freight container.

21. A method according to claim 19, further comprising identifying the contents of said freight container using electromagnetic impulse signals to determine whether there are any sensitive materials in said contents and to determine whether said contents conform to what were declared on the document.

22. A method according to claim 21, further comprising generating an initial loading diagram of said contents of said freight container by analyzing a returned signal which is received from an internal space of said freight container.

23. A method according to claim 21, further comprising generating a second loading diagram of said contents of said freight container and comparing said second loading diagram of said contents with said initial loading diagram of said contents to determine whether the contents of said freight container have changed in any respect.

24. A method according to claim 19, further comprising detecting whether the contents inside the freight container have shifted during transport.

25. A method according to claim 24, wherein said detecting step comprises generating an initial polarity configuration of the internal surfaces of said freight container by analyzing a returned signal which is received from an internal space of said freight container.

26. A method according to claim 24, wherein said detecting step further comprises generating a second polarity configuration of said freight container, and comparing said initial polarity configuration with said second polarization configuration to determine whether said contents of said freight container have shifted during transport.

27. A method according to claim 19, further comprising sensing any sensitive material in the contents using special functional sensors.

28. A method according to claim 19, further comprising determining a real-time position for the freight container.

29. A method according to claim 19, further comprising real-time communicating with a monitoring center to red flag any problem freight container for targeted secondary inspection, to easy pass a normal freight container, and to request random inspection.

* * * * *